(12) United States Patent
Beckett et al.

(10) Patent No.: US 7,734,174 B2
(45) Date of Patent: Jun. 8, 2010

(54) SYSTEM AND METHOD FOR A CHANNEL GUARD IN A RECONFIGURABLE OPTICAL ADD-DROP MULTIPLEXER

(75) Inventors: Douglas James Beckett, Kanata (CA); Brandon Collings, Middletown, NJ (US); Lawrence J. Nociolo, Fair Haven, NJ (US); Eddie Fung, Englishtown, NJ (US)

(73) Assignee: Ciena Corporation, Linthicum, MD (US)

( * ) Notice: Subject to any disclaimer, the term of this patent is extended or adjusted under 35 U.S.C. 154(b) by 623 days.

(21) Appl. No.: 11/704,604

(22) Filed: Feb. 9, 2007

(65) Prior Publication Data

US 2008/0193127 A1    Aug. 14, 2008

(51) Int. Cl.
*H04B 10/08* (2006.01)
*H04B 17/00* (2006.01)
*H04J 14/02* (2006.01)
(52) U.S. Cl. .................. 398/32; 398/34; 398/83
(58) Field of Classification Search .............. 398/32, 398/34, 83, 84, 85
See application file for complete search history.

(56) References Cited

U.S. PATENT DOCUMENTS

| 5,390,185 | A | 2/1995 | Hooijmans et al. |
| 5,798,857 | A | 8/1998 | Tamura et al. |
| 5,995,256 | A | 11/1999 | Fee |
| 6,108,113 | A | 8/2000 | Fee |
| 6,574,016 | B1 | 6/2003 | Harley et al. |
| 7,054,556 | B2 | 5/2006 | Wan et al. |
| 2003/0103252 | A1* | 6/2003 | Liu et al. .................... 359/110 |
| 2005/0226621 | A1* | 10/2005 | Kikuchi et al. ................ 398/83 |

* cited by examiner

*Primary Examiner*—Nathan M Curs
(74) *Attorney, Agent, or Firm*—Clements Bernard PLLC; Christopher L. Bernard; Tyler S. Brown

(57) ABSTRACT

The present invention provides a colorless multiplexing system and method for detecting new optical channels at power levels below that which would cause data errors in existing traffic, and on top of background light, thus, overcoming a known risk inherent in colorless multiplexing—that a channel of the same wavelength as an existing channel is incorrectly added to the original working, traffic-carrying, channel's path.

18 Claims, 12 Drawing Sheets

SYSTEM AND METHOD FOR A CHANNEL GUARD IN A RECONFIGURABLE OPTICAL ADD-DROP MULTIPLEXER

FIELD OF THE INVENTION

The present invention relates generally to the fields of optical networking and data channel modulation. More specifically, the present invention relates to a colorless multiplexing system and method for detecting new optical channels at power levels below that which would cause data errors in existing traffic, and on top of background light, thus overcoming a known risk inherent in colorless multiplexing—that a channel of the same wavelength as an existing channel is incorrectly added to the original working, traffic-carrying, channel's path.

BACKGROUND OF THE INVENTION

Colorless combiners and multiplexers are used to combine wavelengths. For example, in a dynamic wavelength router (DWR) variable optical attenuator mux module (VMUX) a colorless combiner is used to colorlessly combine local add channels. A colorless combiner is also used in a booster-combiner amplifier to colorlessly combine local add channels with express channels from other node degrees.

However, a risk in colorless multiplexing is the potential for the addition of incorrect channel wavelengths that are already in use by working, traffic-carrying, channels, thus causing wavelength collisions and data errors. Such incorrect wavelengths may occur due to errors in tunable-wavelength settings, or by erroneous choice of fixed-wavelength data cards. If the incorrect wavelength is permitted to ramp up in power, then interference will occur between local add channels, or between add and express channels, even when using colored VMUX modules (if they are subtending to a wavelength selective service (WSS)). See, for example, in FIG. 1, wherein a reconfigurable optical add-drop multiplexer (ROADM) node is shown, illustrating modules that are colorless combiners (elements 114, 116), and further illustrating potentially interfering paths (i.e. the dashed lines).

Modulation of data channels is well known in the art. For example, modulation of data channels is used to identify working channels, to quantify parameters in working channels, and to carry ancillary information. U.S. Pat. No. 5,390,185, issued to Hooijmans et al. on Feb. 14, 1995, discloses a transmission system that includes a transmitter for transmitting to a communication channel a send signal, which is a combination of a main signal and an auxiliary signal. U.S. Pat. No. 5,798,857, issued to Tamura et al. on Aug. 25, 1998, discloses spontaneous emission occurring in association with direct optical amplification using an erbium-doped optical fiber that is modulated with an auxiliary signal, such as a supervisory signal, for transmission of the auxiliary signal. U.S. Pat. No. 5,995,256, issued to Fee on Nov. 30, 1999, discloses a method and apparatus that are provided for high signal-to-noise ratio (SNR) optical subcarrier management and reception in a communication network. U.S. Pat. No. 6,108,113, issued to Fee on Aug. 22, 2000, discloses a method and system for transporting ancillary network data wherein a sub-carrier modulation signal containing ancillary network data is superimposed on a high bit-rate data signal prior to transport over an optical link. Additionally, U.S. Pat. No. 6,574,016, issued to Harley et al. on Jun. 3, 2003, discloses a method and apparatus for ancillary data in a wavelength division multiplexed (WDM) system wherein a low bit rate channel is provided over an amplitude modulated sub-carrier that is used to amplitude intensity modulate an optical data signal that is output from a transmitter in the network. Finally, U.S. Pat. No. 7,054,556, issued to Wan et al. on May 30, 2006, discloses the use of fast Fourier Transform (FFT) detection of channel modulation for working traffic channel identification.

Also known in the art is the method of using colored multiplexors (filters) to prevent incorrect wavelengths from being added. However, if colored multiplexors (filters) are introduced, then the system is no longer a colorless multiplex system. Additionally, another method known in the art is to try and detect new channels by a direct power reading before bringing the later channel up to full power. Background light often makes a direct power measurement insensitive, so that the power needed to detect a new channel is higher than the threshold for causing data errors in existing traffic.

The patents disclosed above demonstrate how information may be carried continuously via various modulations techniques, or identify wavelengths in channels at working power. None of these systems or methods, however, are used to verify the suitability of an optical wavelength for addition to an optical system before it is made operational and brought to potentially damaging power, because they lack the ability to cross-correlate modulation information with the physical wavelength selectivity of the Optical Channel Monitor (OCM).

Thus, what is needed is a system and method for detecting new optical channels at powers below that which would cause data errors in existing traffic. Furthermore, what is needed is a system and method for detecting new optical channels at these power levels while on top of background light.

BRIEF SUMMARY OF THE INVENTION

In various exemplary embodiments, the present invention provides a colorless multiplexing system and method for detecting new optical channels at power levels below that which would cause data errors in existing traffic, and on top of background light, thus overcoming a known risk inherent in colorless multiplexing—that a channel of the same wavelength as an existing channel is incorrectly added to the original working, traffic-carrying, channel's path.

In one exemplary embodiment, the present invention provides a method for validating new channel wavelengths in a reconfigurable optical add-drop multiplexer at power levels below that which would cause data errors in existing traffic, and on top of background light. The method includes initiating a software function to add a channel with channel number and add port parameters. The method also includes confirming that the channel number and the add port parameters are valid when compared to predetermined provisioning information. The method also includes setting an add port to a maximum attenuation. The method includes connecting a data card to an add port and bringing the data card to an operational wavelength and power. The method further includes modulating, in a log-sinusoidal function to account for the voltage-to-dB behavior, an add-port variable optical attenuator (VOA) with a modulation frequency uniquely corresponding to the add port. The method further includes recording a time series of a plurality of transmission power data messages. The method further includes computing a fast-Fourier transform (FFT) of the recorded time series data, from which a power spectrum (power versus frequency) is calculated. The method further includes identifying a one or more modulation frequency component that corresponds to predetermined detection criteria. The method further includes comparing the identified one or more identified frequency with the one or more modulated frequency. If there is only one identified frequency, and its value is the same as the modulation frequency, then the add-port VOA is ramped to operation attenuation settings. If more than one, or no modulation frequency, is identified, then a fault exists and an alarm is raised to a user who initiated the channel add. The modulating, in log-sinusoidal, of the add-port variable optical attenuator (VOA) with a modulation frequency uniquely corresponding to the add port is conducted by a dynamic wavelength router (DWR). Optionally, the modulating, in log-sinusoidal, of the add-port variable optical attenuator (VOA) with a modulation frequency uniquely corresponding to the add port is conducted by a VOA Mux Module Digital Signal Processor (DSP). The recording of a time series of a plurality of transmission power data messages is recorded at points spaced 1.6 ms apart. The recording of a time series of a plurality of transmission power data messages is recorded for a duration of 1 to 4 seconds. The identifying a one or more modulation frequency component that corresponds to predetermined detection criteria is conducted by a peak-find algorithm.

In another exemplary embodiment, the present invention provides a method for validating a new add channel wavelength in colorless multiplexing. The method includes modulating an add-port variable optical attenuator (VOA) with a modulation frequency uniquely corresponding to an add port. The method also includes recording a time series of a plurality of transmission power data messages. The method also includes computing a fast-Fourier transform (FFT) of the recorded time series data. The method further includes determining if a channel is being added of the same wavelength as an existing channel. If the channel being added is of the same wavelength as an existing channel, then an alarm is raised to a user who initiated the channel add. If the channel being added is not the same wavelength as an existing channel, then the add-port variable optical attenuator (VOA) is ramped to operation attenuation settings.

In a further exemplary embodiment, the present invention provides a system for validating a new add channel wavelength in colorless multiplexing, at power levels below that which would cause data errors in existing traffic, and on top of background light. The system includes an add port in a reconfigurable optical add-drop multiplexer, an add-port variable optical attenuator (VOA), a data card, connected to the add port, wherein the data card is brought to an operational wavelength and power, and a digital signal processor that modulates the add-port VOA with a modulation frequency uniquely corresponding to the add port. Optionally, a dynamic wavelength router (DWR) is used. The digital signal processor records a time series of a plurality of transmission power data messages and computes a fast-Fourier transform (FFT) of the recorded time series data, from which a power spectrum (power versus frequency) is calculated. A one or more modulation frequency component that corresponds to predetermined detection criteria is identified. The one or more identified frequency is compared with the one or more modulated frequency. If there is only one identified frequency, and its value is the same as the modulation frequency, then the add-port VOA is ramped to operation attenuation settings. If more than one, or no modulation frequency, is identified, then a fault exists and an alarm is raised to a user who initiated the channel add. The digital signal processor records a time series of a plurality of transmission power data messages at points spaced 1.6 ms apart. The digital signal processor records a time series of a plurality of transmission power data messages for a duration of 1 to 4 seconds. A one or more modulation frequency component that corresponds to predetermined detection criteria is identified by a peak-find algorithm.

Advantageously, the present invention provides very high sensitivity for low-power detection of new channels. This sensitivity is limited only by the collection time and works even in the presence of strong background light, thus vastly outperforming direct detection techniques. Additionally, the sensitivity is also better than any digital technique because digital techniques require a fixed noise bandwidth. Furthermore, FFT technique of the present invention has a noise-bandwidth that is reduced in proportion to the collection time. Also advantageously, the system and method of the present invention are applicable to any multi-wavelength optical product that uses colorless muxing, and those for which verification of optical port connections is required.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the related claims.

Figure 1:
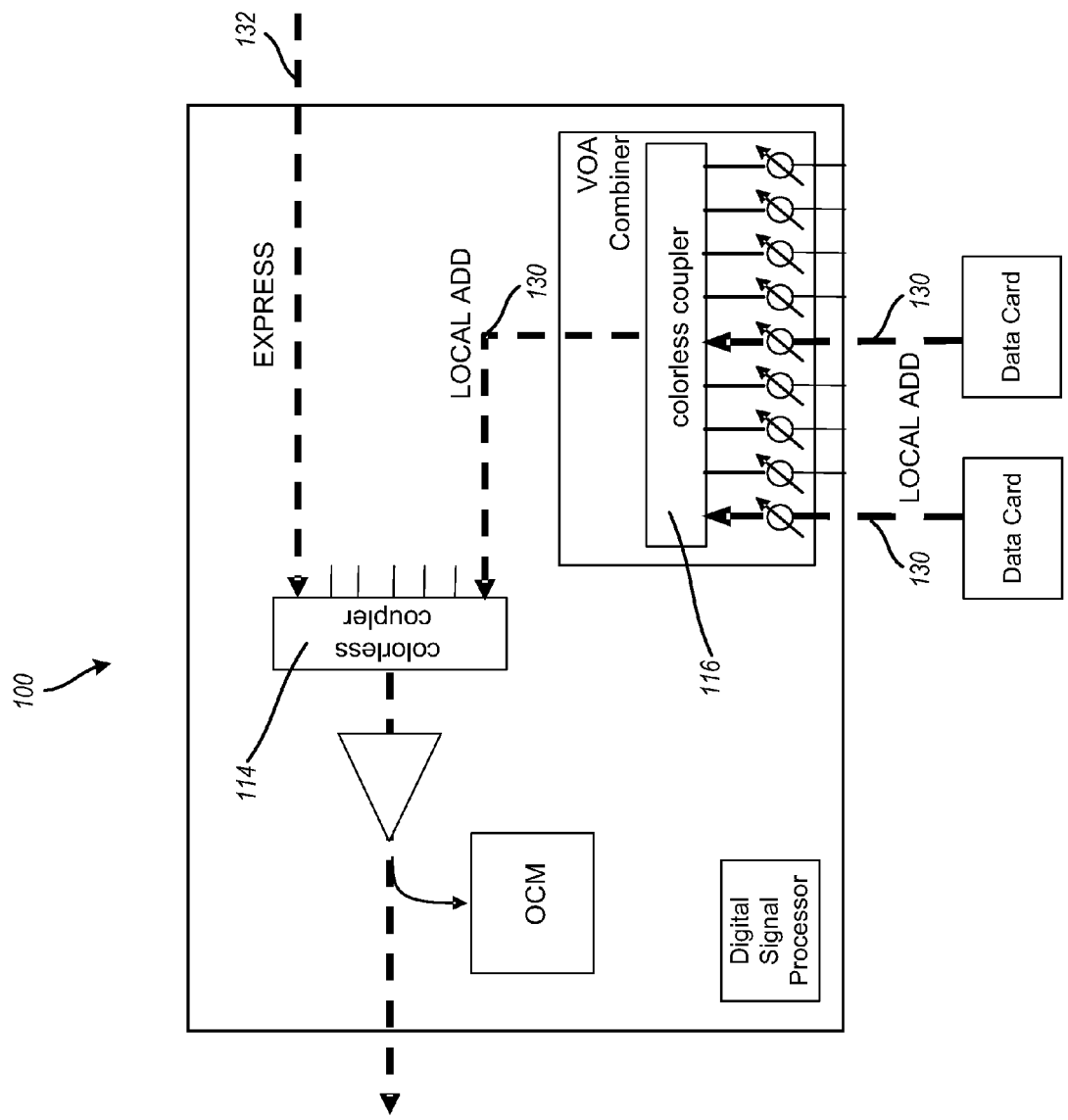
FIG. 1 is a schematic diagram of a reconfigurable optical add-drop multiplexer (ROADM) node, illustrating, in particular, modules that are colorless combiners, and further illustrating potentially interfering paths.

Referring now to FIG. 1, a reconfigurable optical add-drop multiplexer (ROADM) 100 node is shown. The ROADM is shown illustrating, in particular, modules that are colorless combiners, 114, 116, and further illustrating potentially interfering paths, the dashed lines, 130, 132.

A risk in colorless multiplexing is the addition of incorrect channel wavelengths (i.e. the dashed lines shown in FIG. 1, 130, 132 which illustrate potentially interfering paths) that are already in use by working, traffic-carrying, channels. Such incorrect wavelengths may occur due to errors in tunable-wavelength settings, or by erroneous choice of fixed-wavelength data cards. If the incorrect wavelength is permitted to ramp up in power, then interference will occur between local add channels 130 or between add channels 130 and express 132 channels, even when using colored VMUX modules (if they are subtending to a WSS).

Typically, the incoherent crosstalk magnitude that would cause errors is in the range of −15 dB relative to the power of the working channel. For the case of coherent crosstalk, the effect of interference is much more severe, and may occur at crosstalk levels below −25 dB for non-forward-error-corrected (FEC) channels. Therefore, the target for the maximum add channel 130 power is between 15 and 25 dB below the weakest working channel.

Figure 2:
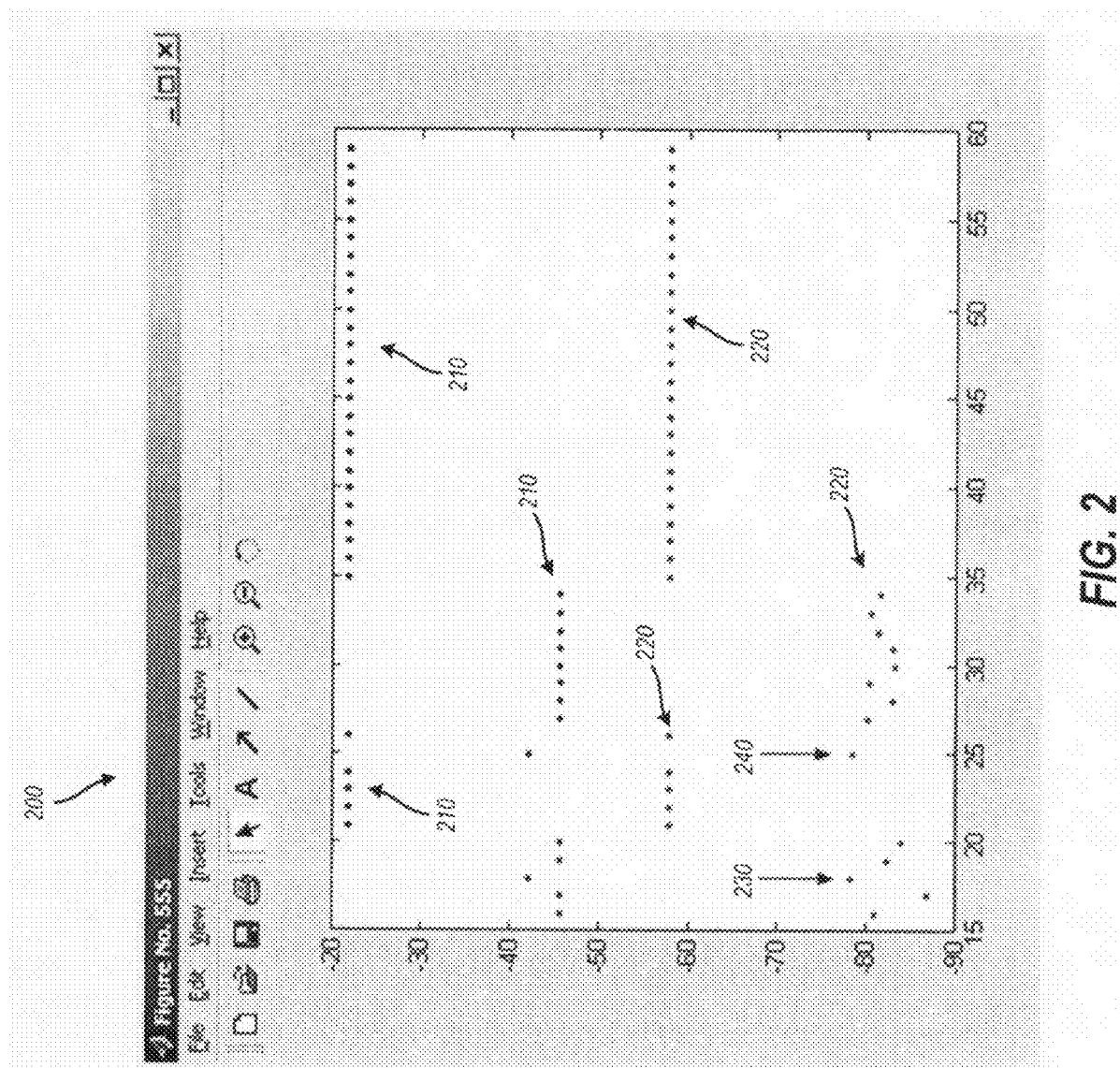
FIG. 2 is a diagram of a mostly-full optical channel monitor (OCM) output spectrum with add channels 18 and 25 at crosstalk level −18 dB, illustrating, in particular, the optical power incident on the OCM p-i-n diodes and the OCM electrical output.

Referring now to FIG. 2, a diagram of a mostly-full optical channel monitor (OCM) output spectrum 200 is shown. The OCM provides channel identification and measurements of wavelength, power and optical signal-to-noise ratio (OSNR) measurements. The OCM output spectrum 200 is shown with add channels 18 and 25 (arrows 230, 240 respectively) at crosstalk level −18 dB. The optical power incident on the OCM p-i-n diodes 210 is shown. The OCM electrical output 220 is also shown. The largest problem with add-channel recognition, as shown in FIG. 2, is the noise floor on the OCM output.

Figure 3:
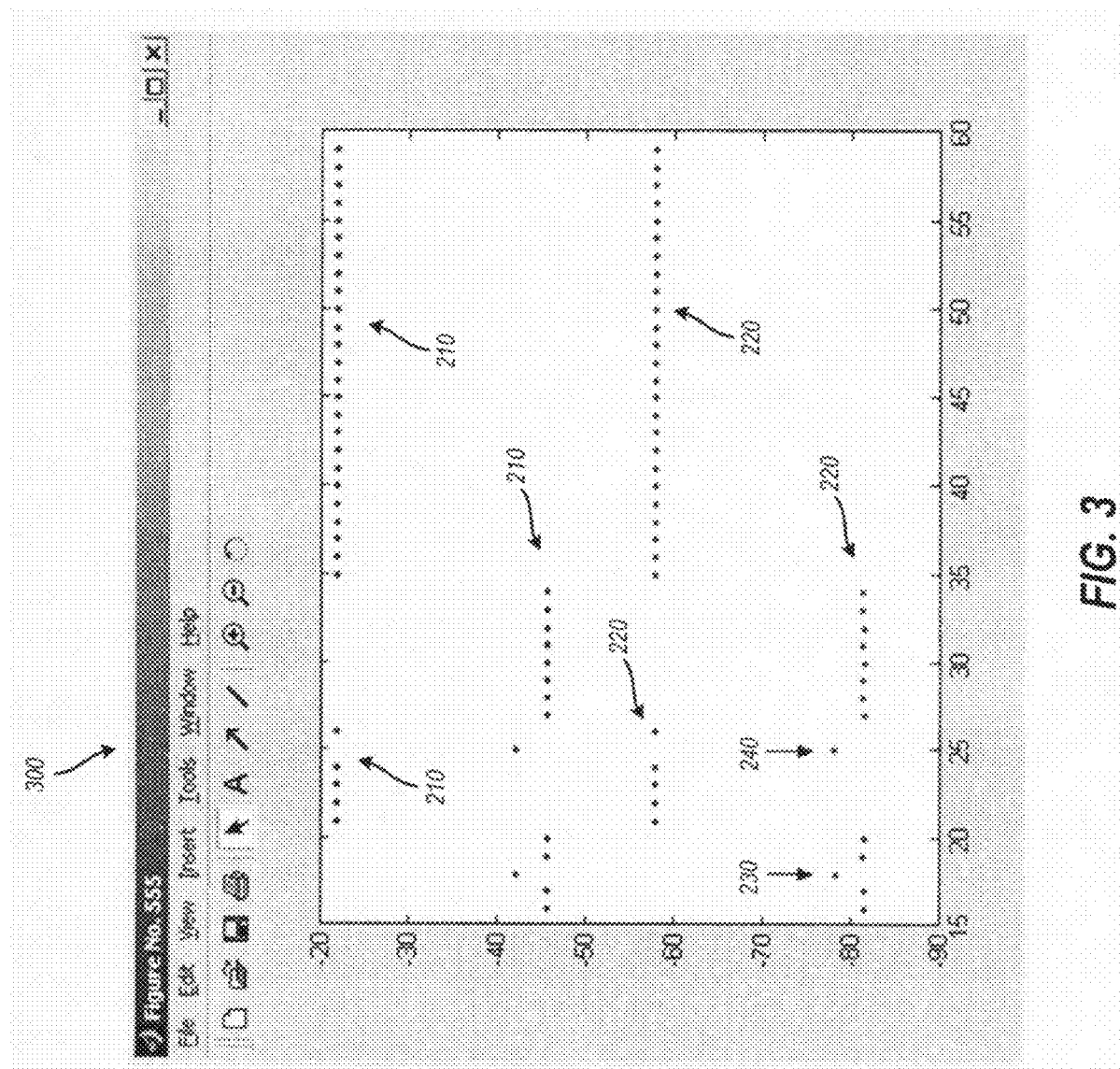
FIG. 3 is a diagram of the OCM spectrum shown in FIG. 2, additionally illustrating, in particular, the crosstalk level −18 dB after 2 seconds of averaging has taken place.

Referring now to FIG. 3, a diagram of a mostly-full optical channel monitor (OCM) output spectrum 300 is shown. In particular, and in addition to that shown in FIG. 2, the crosstalk level −18 dB after 2 seconds of averaging has taken place is illustrated. The OCM output spectrum 300 is shown with add channels 18 and 25 (arrows 230, 240 respectively) at crosstalk level −18 dB after 2 seconds of averaging. The optical power incident on the OCM p-i-n diodes 210 is shown. The OCM electrical output 220 is also shown.

For example, when using OCM equipment, after averaging has taken place, the minimum reliably detectable channel power is approximately 3 dB above the background, limited by the OCM crosstalk specification of 25 dB. Therefore, 22 dB is detectable.

At first it may appear that this is sufficient to detect add channels 130 before they are allowed to increase in power to traffic-impacting levels. However, a limitation exists with the accurate setting of VCOM VOA 114 attenuation: VOA specifications were set with closed-loop operation as the goal, while the detection of add channels 130 is, by definition, an open-loop technique. Open-loop operation of the VOAs forces "guard-banding" of the maximum allowable add-channel power. For example, open-loop setpoints of VCOM VOAs are expected to vary by approximately as much as ±5 dB over temperature and life.

The consequence of this open-loop variation is that target add-channel attenuations must be set 5 dB higher (i.e., 5 dB lower channel power) to guard against the possibility that the VOA has drifted into the low-attenuation regime. Furthermore, at this lower power setting, it is possible that the VOA might be at a high-attenuation excursion. Therefore, the add-channel 130 power might be as much as 10 dB below the safe crosstalk target power level.

Using the target crosstalk levels for the maximum add channel 130 power between 15 and 25 dB below the weakest working channel, one is therefore forced to detect "add" channels at 25 to 35 dB below the weakest working channel, which is not feasible for the direct detection method. Thus, the modulation-fast Fourier transform (FFT) method is preferred over direct observation of the OCM output spectrum.

As an alternative to direct observation of the OCM output spectrum, a modulation-FFT technique is disclosed herein whereby incorrect wavelengths can be identified at the add node at power levels sufficiently low to prevent interference with existing traffic.

Figure 4:
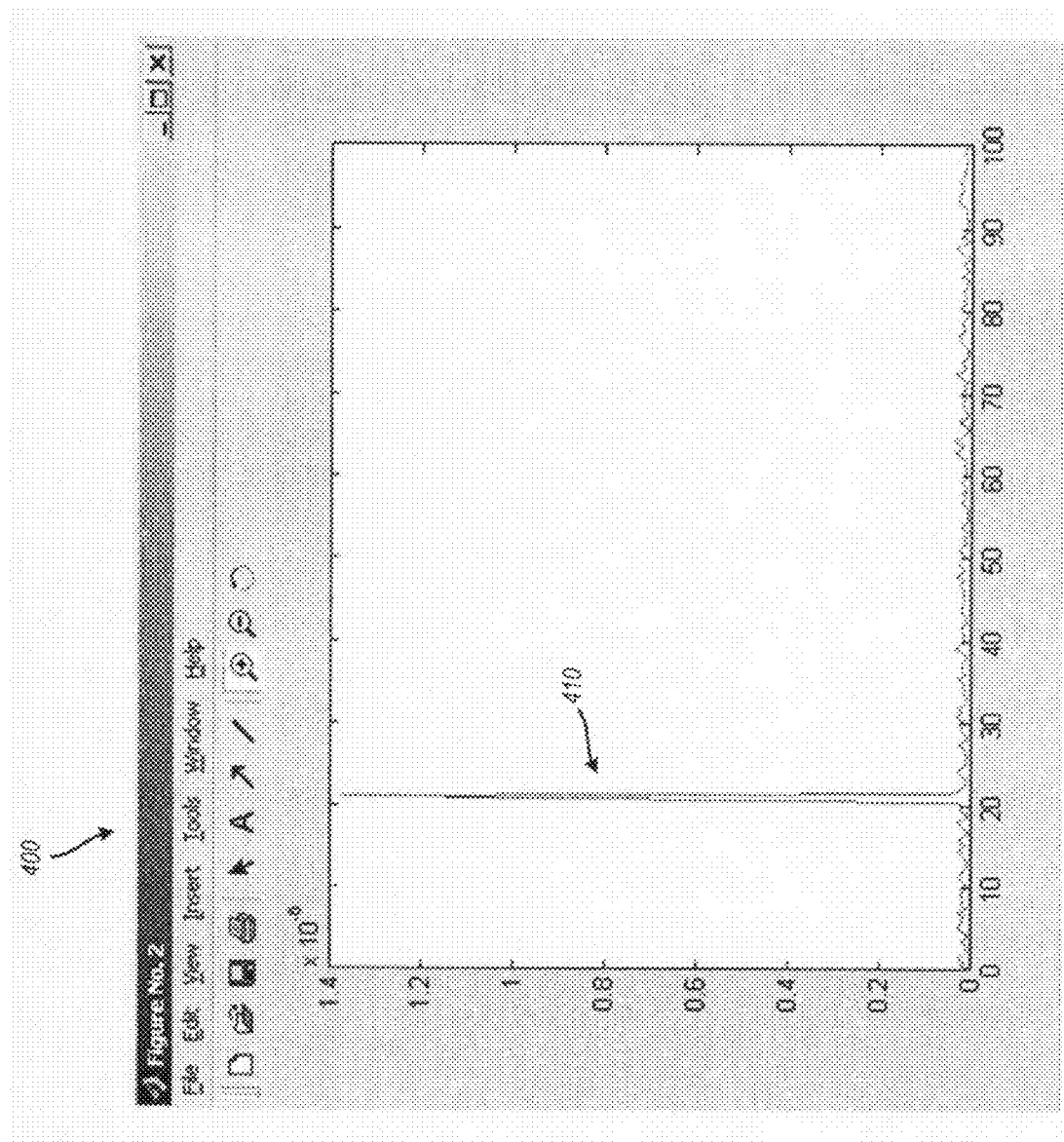
FIG. 4 is a diagram of a signal derived from processing of OCM output with variable optical attenuator (VOA)-modulated add channel at 35 dB below working channels, illustrative of a technique where incorrect wavelengths are identified at the add node at sufficiently low power, used to raise alarms before errors occur in working channels.

Referring now to FIG. 4, a diagram 400 of a signal derived from the processing of OCM output with variable optical attenuator (VOA)-modulated add channel at 35 dB below working channels is shown. This illustrates a technique where incorrect wavelengths are identified at the add node at sufficiently low power and are subsequently used to raise alarms before errors occur in working channels. Specifically shown in FIG. 4 is an example OCM output for the case of −35 dB crosstalk. Obviously, the peak detection 410 in FIG. 4 is much easier to identify than in FIG. 3, even with 17 dB weaker optical power.

The modulation-FFT technique also is used to raise alarms before errors occur in working channels. Additionally, the modulation-FFT technique is used to identify the fault condition in which the wavelength is correct, but the data card has been connected to an incorrect port of the multiplexer.

The primary requirement of the modulation-FFT technique is that new channels are not permitted to interfere with existing channels. Thus, new channel wavelengths must be identified and then either validated or rejected before being allowed to increase in power to the point where interference occurs.

The modulation-FFT technique is a simple, robust, and highly sensitive method for validating new channel wavelengths. A user initiates a "Channel Add" software function, with parameters: <add_wavelength> (channel number) and VCOM or VMUX <add_port>. The software program is then used to check that the input parameters (e.g. wavelengths) are valid according to existing provisioning information. The port <add_port> is set to a maximum attenuation. (The port should already have been set there.)

A data card is connected to the add port, and subsequently is brought to operational wavelength and power. Either a dynamic wavelength router (DWR) or a VOA mux module (VMUX) digital signal processor (DSP) is then used to begin a log-sinusoidal modulation (or closest discrete approximation) of the VCOM or VMUX add-port VOA, with a modulation frequency uniquely corresponding to <add_Port> (e.g. 21 Hz for port 1, or any other 1:1 port-to-frequency mapping).

Assuming a VMUX DSP is used for modulation, the DSP records a time-series of transmission power data messages from its local OCM for the OCM-channel at <add_wavelength>. The timing may be recorded, for example, at points spaced approximately every 1.6 ms, or at other OCM output cadence in case of shared OCM. This time-series may be recorded, for example, for approximately one to four seconds.

Once the recording time is complete, the DSP computes a fast Fourier-transform (FFT) of the time-series data, from which a power spectrum (power versus frequency) is calculated. A "peak-find" algorithm (PFA) is used to identify modulation frequency components that meet predetermined detection criteria.

The identified frequency or frequencies are then compared with the modulation frequency. If there is only one identified frequency, and its value agrees with the modulation frequency, then the add-port VOA may be ramped to operation attenuation settings, and control is passed to power control algorithms. If more than one VOA modulation frequency, or no modulation frequency, is identified, then a fault exists and an alarm is raised to the user who initiated the channel add.

There are several advantages to using the modulation-FFT technique. For example, when compared to OCM direct observation, the modulation-FFT technique is highly-sensitive and stays below the threshold for crosstalk errors. Additionally, with the modulation-FFT technique, a multi-channel add-port mismatch alarm can be used. Although the development effort to implement the modulation-FFT technique is extensive, many deficiencies known in the direct observation of OCM output spectrum are overcome by its implementation. For example, with the direct observation of OCM output spectrum there exists a high risk for channel hits in the case of adding an incorrect wavelength. Additionally, no multi-channel add-port mismatch alarm is available with direct observation of OCM output spectrum.

The modulation-FFT technique has been modeled and simulated, including all available parameters of OCM p-i-n noise and channel OSNR. This simulation helps determine both the sensitivity of the technique, and the dynamic range, speed and resolution requirements for ingress channel VOAs. The OCM-reading time-series is constructed with the peak power determined by the crosstalk requirement. A quasi-sinusoidal waveform is constructed. The model has the ability to simulate modulation of the VOA down to one significant bit. This results in a square wave (−40 dB to $A_{CG}$, where $A_{CG}$ is the attenuation to deliver less than maximum crosstalk, and represents 0 DAC voltage plus 1 bit). Thus, the impact of aliased harmonics due to DAC granularity is included in the analysis.

Figure 5:
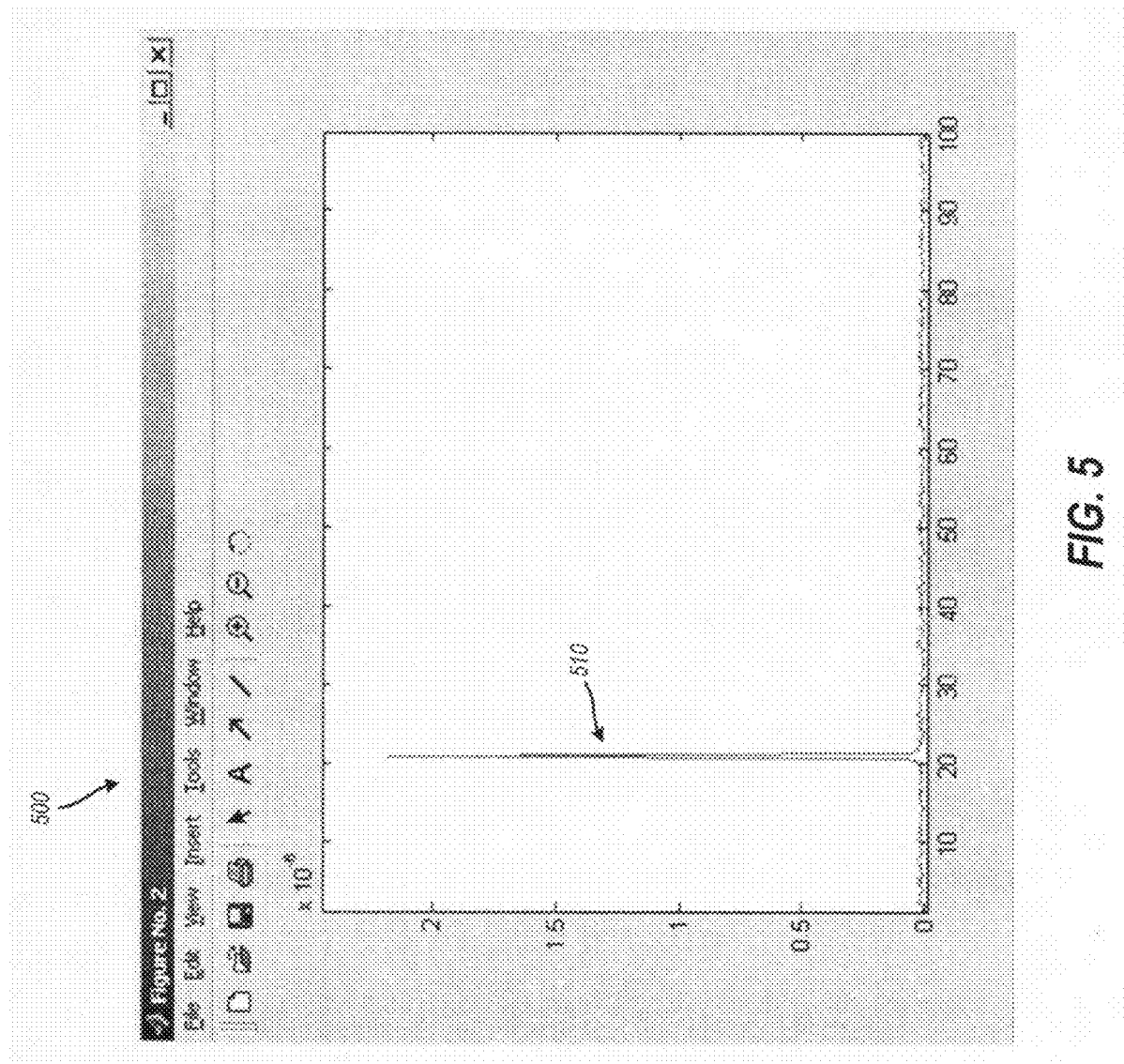
FIG. 5 is a diagram of a fast Fourier transform (FFT) of a simulated add channel with the modulation frequency equal to channel 21.

Referring now to FIG. 5, a diagram of a fast Fourier transform (FFT) 500 of a simulated add channel with the modulation frequency equal to channel 21 is shown, illustrating a visual representation of a correct wavelength on a correct VCOM port. The calculated OSNR for the amplifier combination is 37 dB, collection time 4 s, DAC modulation range is 100 (decimal) out of a total range of 4096. (The expected real operating range is closer to 1000.) With a suitable peak-finding algorithm, it is clear that the feature 510 in this figure could be easily identified as a 21 Hz modulation.

Figure 6:
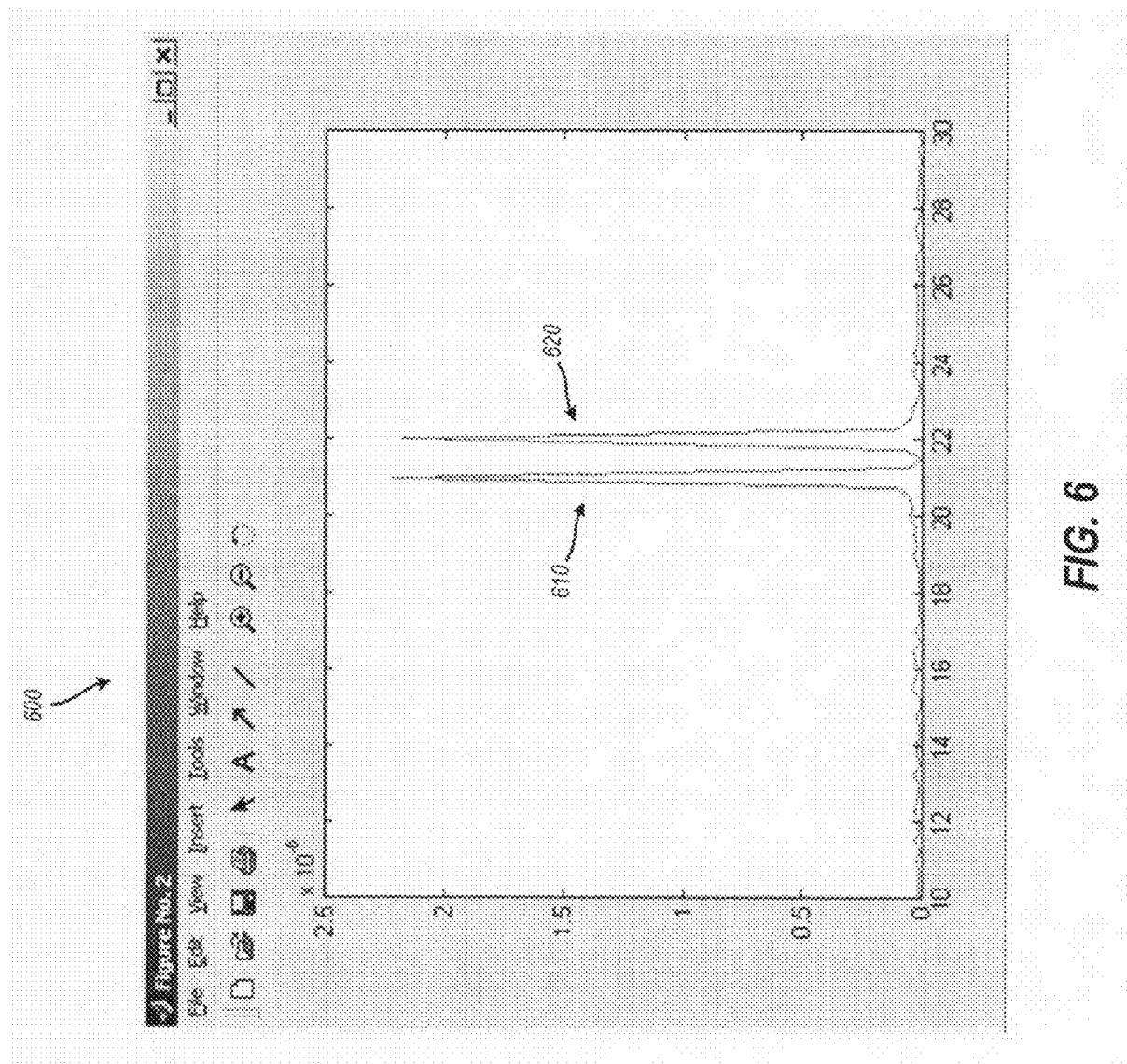
FIG. 6 is a diagram of a fast Fourier transform (FFT) of two add channels on different VOA combiner module (VCOM) ports having the same wavelength, illustrating how the detection of two peaks would raise an alarm.

Referring now to FIG. 6, a diagram representing two add channels on different VOA combiner module (VCOM) ports 600 having the same wavelength is shown. The diagram 600 illustrates in particular how the detection of two peaks 610, 620 would raise an alarm to the user who initiated the channel add. A diagram of this nature would occur if simultaneous channel additions on two VCOM ports accidentally ended up on the same wavelength.

Figure 7:
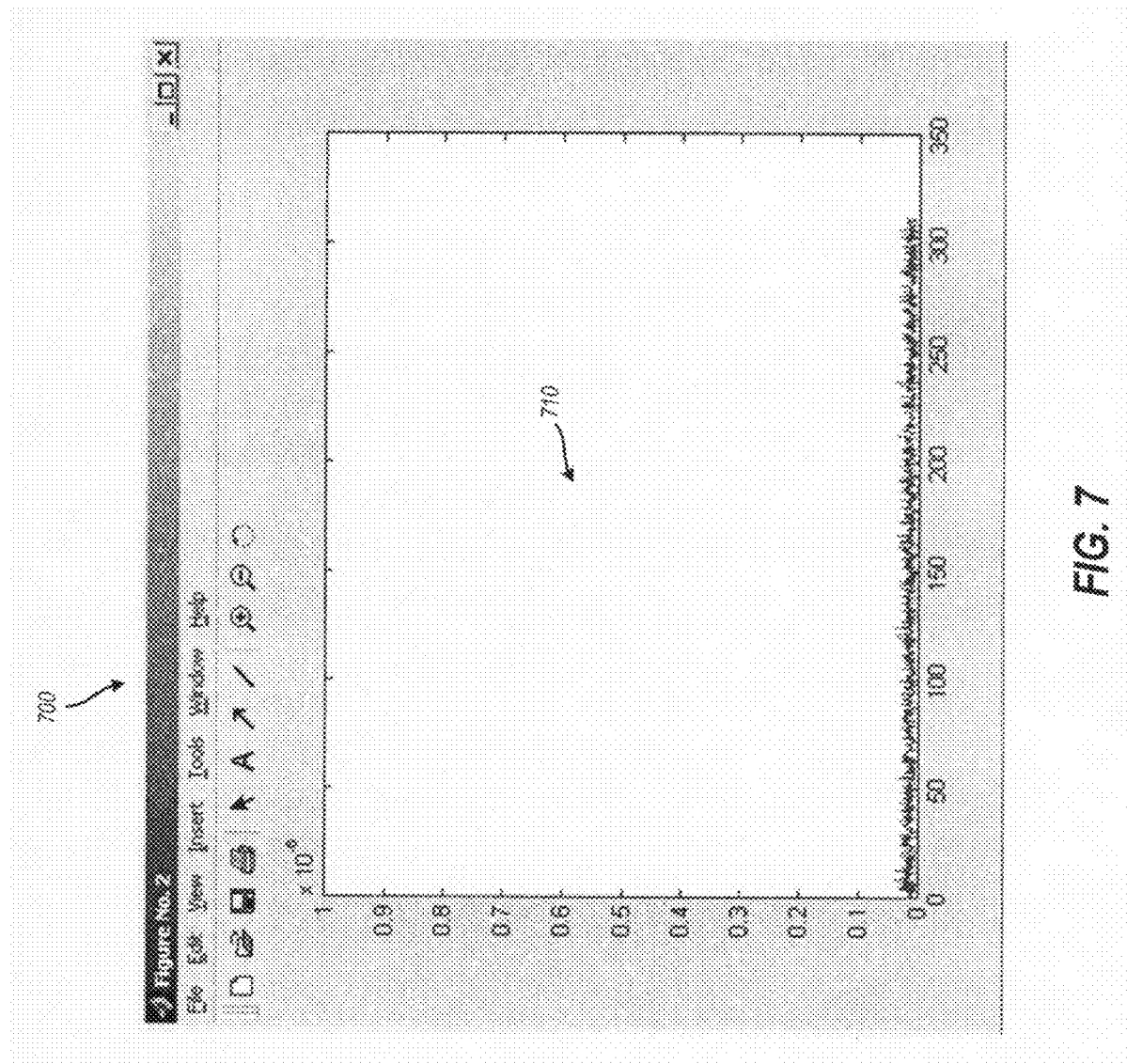
FIG. 7 is a diagram illustrative of a fast Fourier transform (FFT) of either an add channel that has the wrong wavelength or an add channel that is on wrong VCOM port, both of which have display results as shown, and additionally illustrating how the lack of any peak raises an alarm.

Referring now to FIG. 7, a diagram 700 illustrative of either an add channel that has the wrong wavelength or an add channel that is on the wrong VCOM port is shown. This diagram 700 additionally illustrates how the lack of any peak 710 in the display area raises an alarm.

Figure 8:
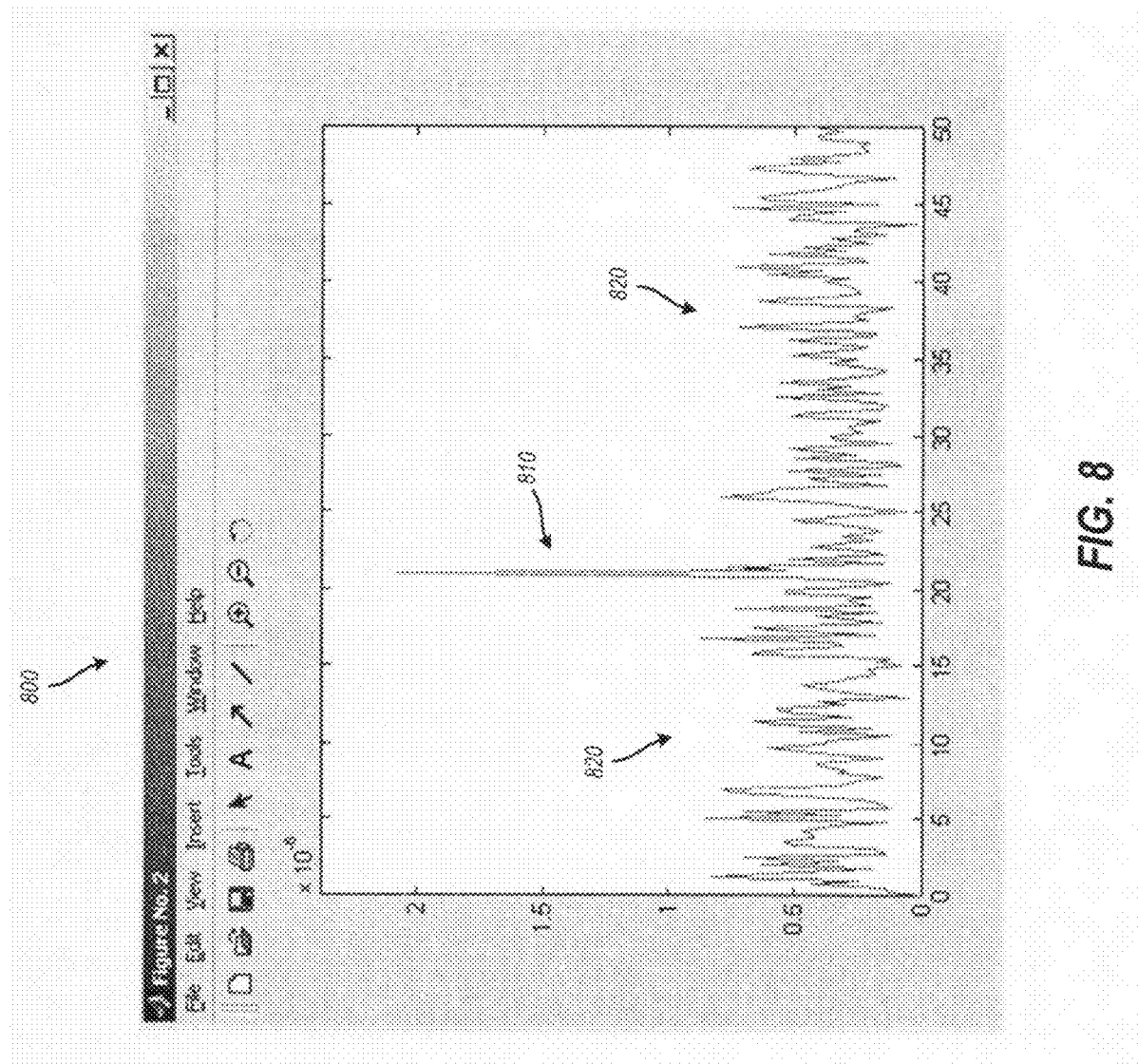
FIG. 8 is a diagram of an add channel having the wrong wavelength and located on top of the express channel, illustrative of a method for locating a missing add channel on top of working traffic and identifying an incorrect add wavelength.

Referring now to FIG. 8, a diagram 800 of an add channel having the wrong wavelength and located on top of the express channel is shown. This diagram 800 is illustrative of a troubleshooting method for locating a missing add channel on top of working traffic, an express channel, and for identifying an incorrect add wavelength. If the initial channel validation fails (zero peaks, or more than one peak), then the user may want troubleshooting information. One scenario would have a new channel on top of an express channel, with a 29 dB lower power implementing the modulation-FFT technique. A function hunts through all of the OCM channels looking for the VCOM modulation frequency. The FFT result for such a case, where the simulated add channel is channel 21, but is actually at wavelength 20 (or anything other than 21), is shown. In this case, the 21 Hz modulation amplitude on channel 20 is 29 dB below the very strong working channel level, as shown. It is clear from the figure that a peak 810 at 21 Hz is discernible above the noise 820, and could be used to identify the presence of an incorrect "add" wavelength.

This method is also useful in another troubleshooting method. The method is used to detect an add channel that has the correct wavelength, but that is connected to the wrong port. In this scenario, the troubleshooting function would modulate all unused port VOAs at frequencies that uniquely identify the port numbers, while the same OCM channel data time-series is re-collected. The detected frequency then indicates to the user the incorrect connection. It may suffice for the user to simply re-run the validation with the new value of <add_port> rather than fix the patchcord connection.

There are certain VOA requirements for the modulation-FFT technique. VOA bandwidth must be high enough to support the channel guard coding modulation frequencies. The impact of a limited modulation frequency has been modeled and simulated.

The DSP generates a sinusoidal waveform on the VOA by writing sequential settings to the DAC. The waveform will be in discrete steps, separated by the resolution of the DAC. The DAC range available for modulation must be sufficient to avoid "squaring" of the waveform, the worst instance of which occurs when only the least-significant DAC bit results in an add channel power below the maximum.

Figure 9:
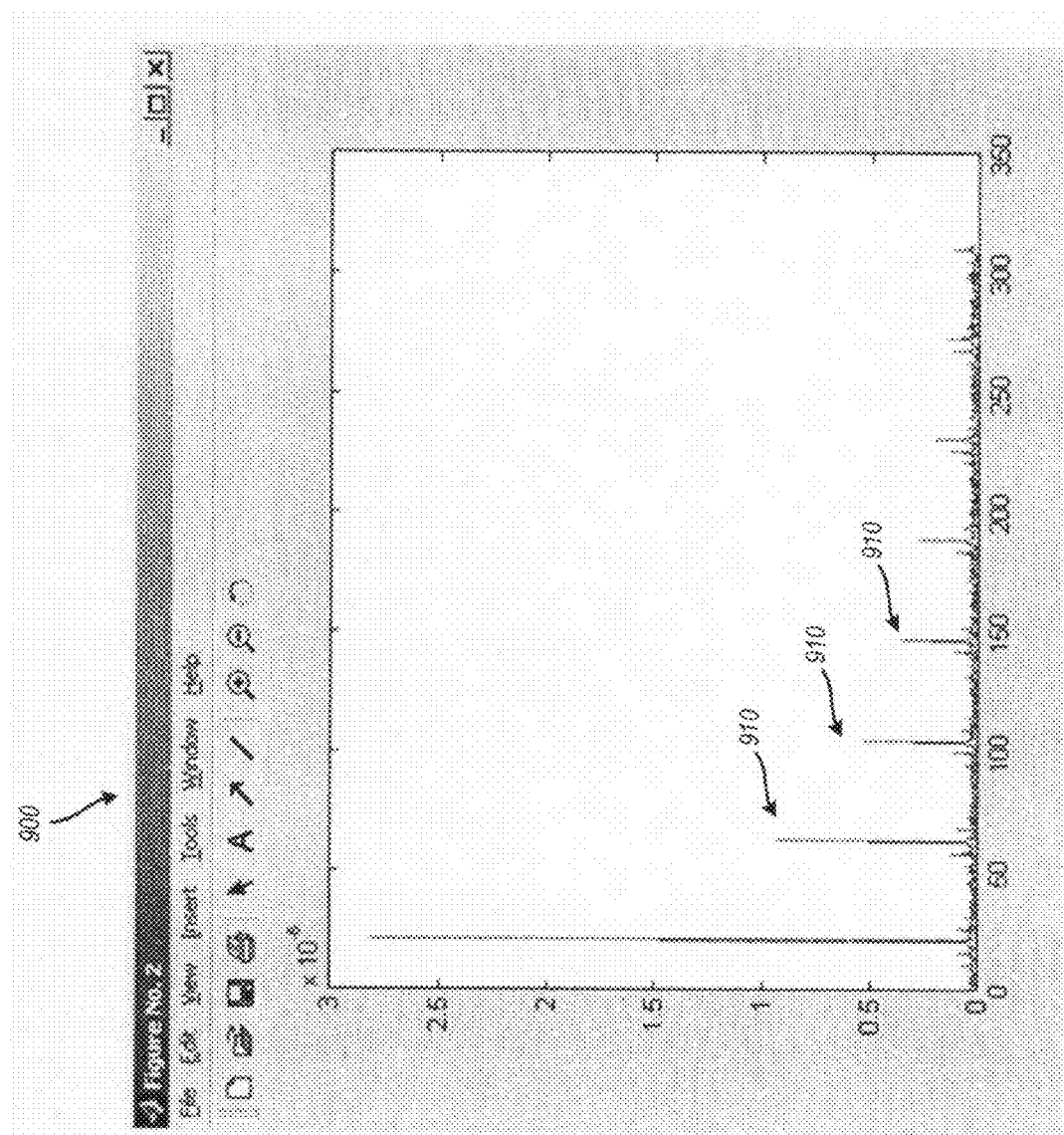
FIGS. 9 through 11 are diagrams illustrative of the effects of discretization, illustrating in particular, the harmonics from a 21 Hz sine wave modulation showing discrete edges (or discretization), wherein squaring of the waveform has occurred (an undesirable result) due to the insufficiency of the DAC range available for modulation, shown in FIG. 9 at two DAC levels, in FIG. 10 at three DAC levels, and in FIG. 11 at ten DAC levels (out of 4096)
Figure 10:
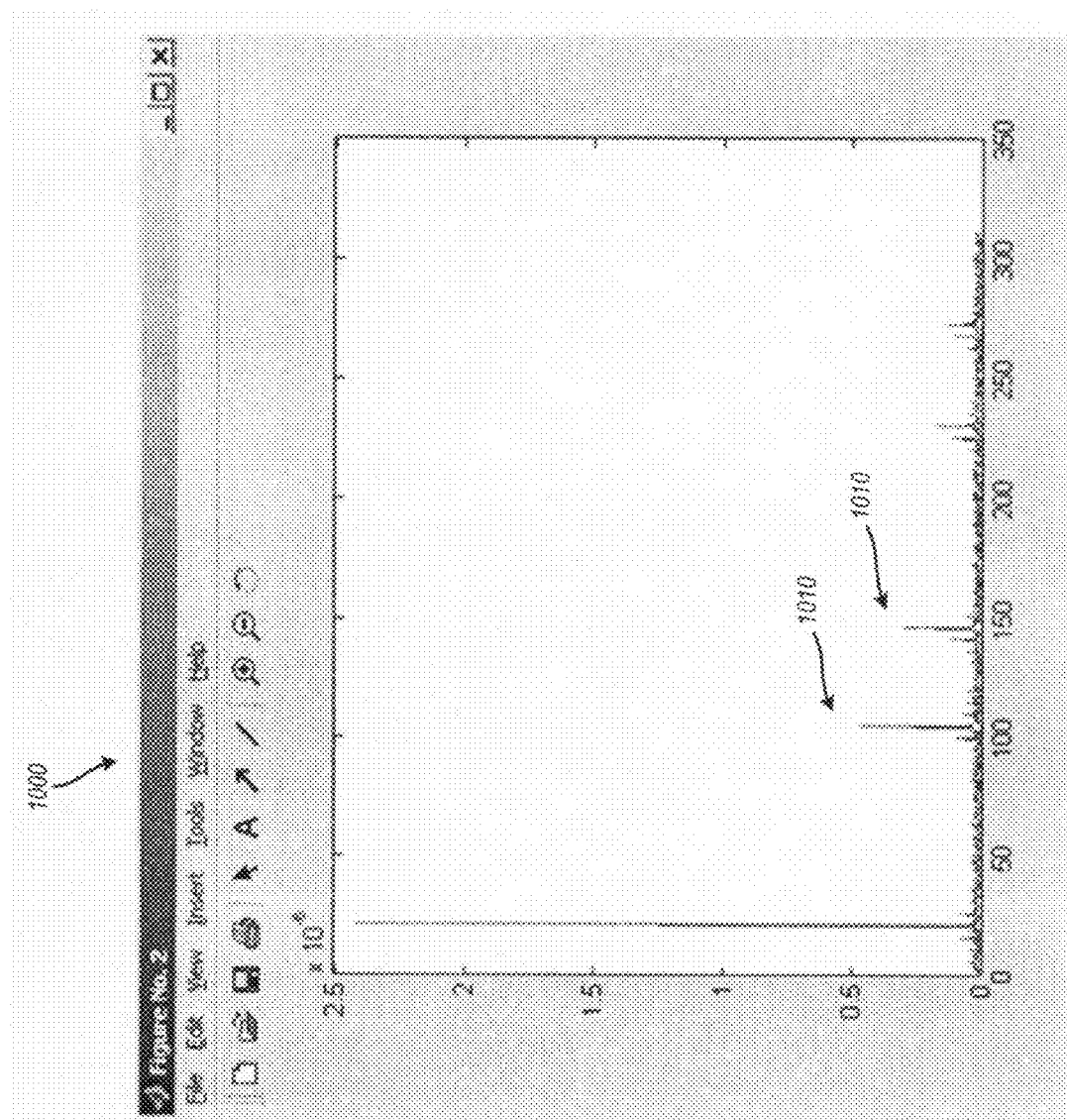
Figure 11:
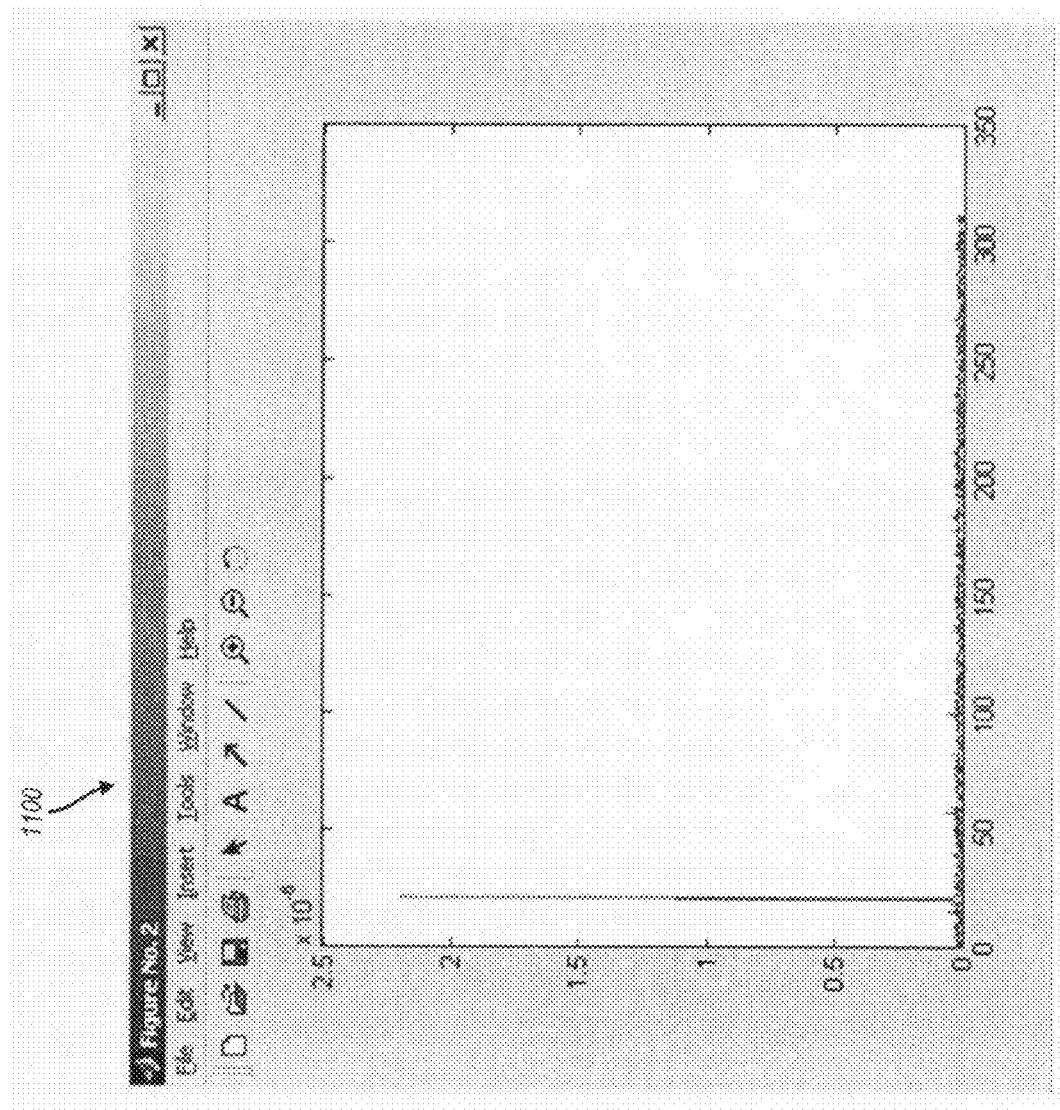

Referring now to FIGS. 9 through 11, diagrams 900, 1000, 1100, illustrative of the effects of discretization, are shown. Specifically, the harmonics from a 21 Hz sine wave modulation showing discrete edges (or discretization), wherein squaring of the waveform (910 in FIG. 9, 1010 in FIG. 10) has occurred due to the insufficiency of the DAC range available for modulation are shown. The squaring of the waveform is an undesirable result. In FIG. 9 the harmonics 900 are shown at two DAC levels (a square wave). In FIG. 10 the harmonics 1000 are shown at three DAC levels. In FIG. 11 the harmonics 1100 are shown at ten DAC levels (out of 4096), with no squaring of the waveform. In the modulation-FFT technique, with an expected DAC range below 30 dB of about 1000 levels, the discrete edges are not expected to be a problem. The effects of discretization are also mitigated by lower VOA bandwidth.

Figure 12:
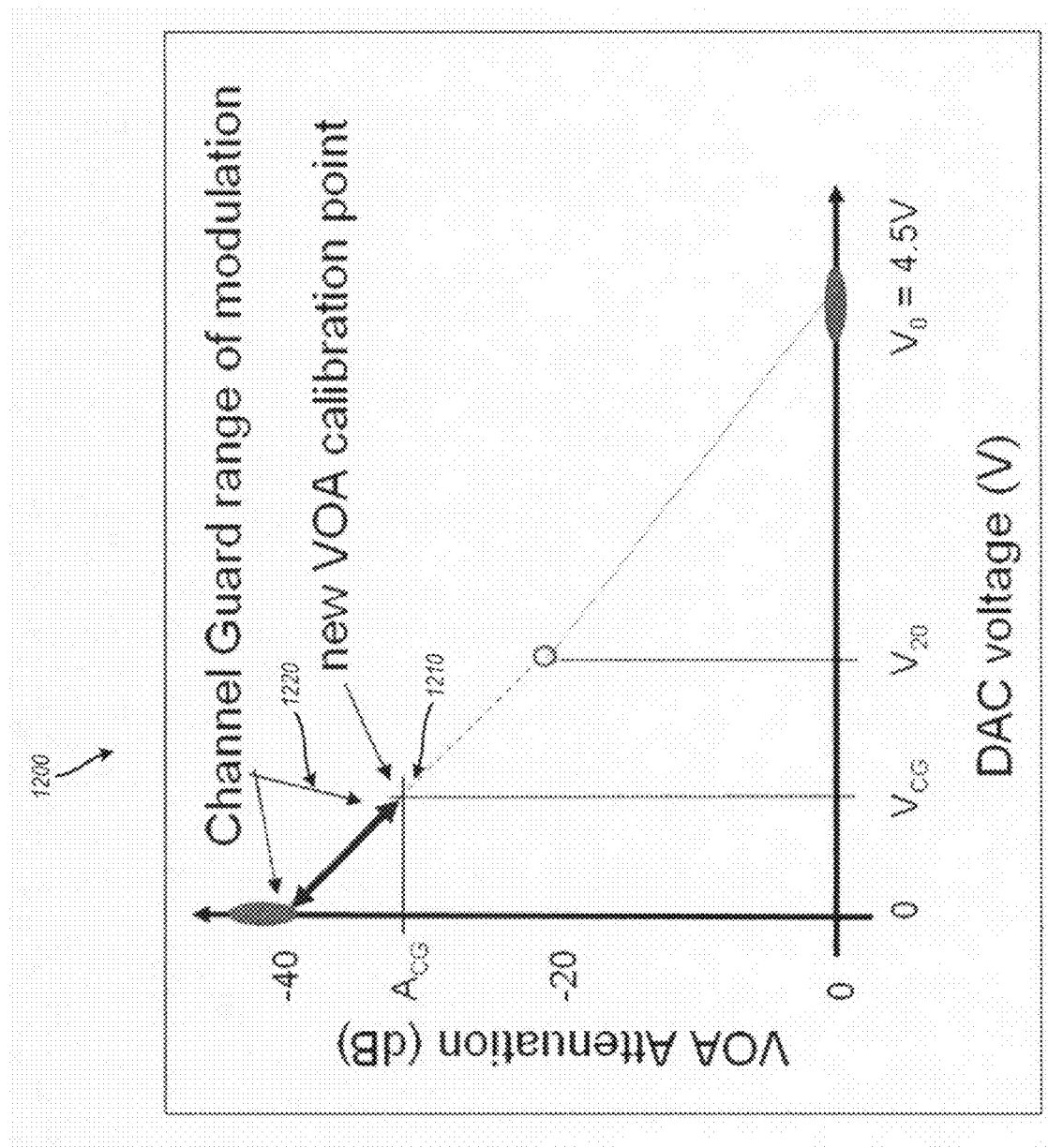
FIG. 12 is a diagram showing VOA attenuation (dB) versus DAC voltage (V), illustrating, in particular, the required VOA voltage measurement point at the attenuation necessary for the Channel Guard, and the range over which Channel Guard will operate

Referring now to FIG. 12, diagram 1200 illustrates VOA attenuation (dB) versus DAC voltage (V). The diagram 1200 illustrates, in particular, the required VOA voltage measurement point 1210 at the attenuation necessary for the channel guard and the channel guard range of modulation 1220. An additional VOA measurement point is required at the 29-35 dB attenuation needed for channel guard, as shown with the current spec and measured points. The attenuation value for this measurement may be lowered to allow for VOA aging and temperature effects. Very slow VOAs that impact the modulation amplitude will require lower tone frequencies, which in turn might impact the choice of port:tone frequency mapping. Large reductions in add channel power will necessitate longer measurement times for FFT signal-to-noise reasons. The discrete nature of DAC settings for the log-sinusoidal waveform is not relevant above ~10 DAC levels. The full DAC range is 4096 levels (12 bits) and is expected to be linear in the range needed for Channel Guard.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A method for validating new channel wavelengths in a reconfigurable optical add-drop multiplexer at power levels below that which would cause data errors in existing traffic, and on top of background light, comprising:
    connecting a data card to an add port and bringing the data card to a minimum detectable wavelength and power;
    modulating, in log-sinusoidal, an add-port variable optical attenuator (VOA) with a modulation frequency uniquely corresponding to the add port;
    recording a time series of a plurality of transmission power data messages;
    computing a fast-Fourier transform (FFT) of the recorded time series data, from which a power spectrum (power versus frequency) is calculated;
    identifying a one or more modulation frequency component that corresponds to predetermined detection criteria; and
    comparing the identified one or more identified frequency with the one or more modulated frequency.

2. The method for validating new channel wavelengths in a reconfigurable optical add-drop multiplexer of claim 1, wherein if there is only one identified frequency, and its value is the same as the modulation frequency, then the add-port VOA is ramped to operational attenuation settings.

3. The method for validating new channel wavelengths in a reconfigurable optical add-drop multiplexer of claim 1, wherein if more than one, or no modulation frequency, is identified, then a fault exists and an alarm is raised to a user who initiated the channel add.

4. The method for validating new channel wavelengths in a reconfigurable optical add-drop multiplexer of claim 1, further comprising:
    initiating a software function to add a channel with channel number and add port parameters;
    confirming that the channel number and the add port parameters are valid when compared to predetermined provisioning information; and
    setting an add port to a maximum attenuation.

5. The method for validating new channel wavelengths in a reconfigurable optical add-drop multiplexer of claim 1, wherein the modulating, in log-sinusoidal, of the add-port variable optical attenuator (VOA) with a modulation frequency uniquely corresponding to the add port is conducted by a dynamic wavelength router (DWR).

6. The method for validating new channel wavelengths in a reconfigurable optical add-drop multiplexer of claim 1, wherein the modulating, in log-sinusoidal, of the add-port variable optical attenuator (VOA) with a modulation frequency uniquely corresponding to the add port is conducted by a VOA Mux Module Digital Signal Processor (DSP).

7. The method for validating new channel wavelengths in a reconfigurable optical add-drop multiplexer of claim 1, wherein the recording of a time series of a plurality of transmission power data messages is recorded at intervals equally spaced apart.

8. The method for validating new channel wavelengths in a reconfigurable optical add-drop multiplexer of claim 1, wherein the recording of a time series of a plurality of transmission power data messages is recorded for a predetermined duration.

9. The method for validating new channel wavelengths in a reconfigurable optical add-drop multiplexer of claim 1, wherein the identifying a one or more modulation frequency component that corresponds to predetermined detection criteria is conducted by a peak-find algorithm.

10. A method for validating a new add channel wavelength in colorless multiplexing, comprising:
    connecting a data card to an add port and bringing the data card to a minimum detectable wavelength and power;
    modulating an add-port variable optical attenuator (VOA) with a modulation frequency uniquely corresponding to the add port;
    recording a time series of a plurality of transmission power data messages with a digital signal processor;
    computing a fast-Fourier transform (FFT) of the recorded time series data with the digital signal processor, wherein a power spectrum (power versus frequency) is calculated from the FFT; and
    determining if a channel is being added of the same wavelength as an existing channel by identifying one or more modulation frequency component that corresponds to predetermined detection criteria and comparing the modulation frequency with the identified one or more modulation frequency component.

11. The method for validating a new add channel wavelength in colorless multiplexing of claim 10,
wherein if the channel being added is of the same wavelength as an existing channel, then an alarm is raised to a user who initiated the channel add.

12. The method for validating a new add channel wavelength in colorless multiplexing of claim 10,
wherein if the channel being added is not the same wavelength as an existing channel, then the add-port variable optical attenuator (VOA) is ramped to operational attenuation settings.

13. A system for validating a new add channel wavelength in colorless multiplexing, at power levels below that which would cause data errors in existing traffic, and on top of background light, comprising:
an add port in a reconfigurable optical add-drop multiplexer;
an add-port variable optical attenuator (VOA);
a data card, connected to the add port, wherein the data card is brought to an operational wavelength and power;
a digital signal processor that modulates the add-port VOA with a modulation frequency uniquely corresponding to the add port;
wherein the digital signal processor records a time series of a plurality of transmission power data messages and computes a fast-Fourier transform (FFT) of the recorded time series data, from which a power spectrum (power versus frequency) is calculated;
wherein a one or more modulation frequency component that corresponds to predetermined detection criteria is identified; and
wherein the one or more identified frequency is compared with the one or more modulated frequency.

14. The system for validating a new add channel wavelength in colorless multiplexing of claim 13,
wherein if there is only one identified frequency, and its value is the same as the modulation frequency, then the add-port VOA is ramped to operation attenuation settings.

15. The system for validating a new add channel wavelength in colorless multiplexing of claim 13,
wherein if more than one, or no modulation frequency, is identified, then a fault exists and an alarm is raised to a user who initiated the channel add.

16. The system for validating a new add channel wavelength in colorless multiplexing of claim 13,
wherein the digital signal processor records a time series of a plurality of transmission power data messages at intervals equally spaced apart.

17. The system for validating a new add channel wavelength in colorless multiplexing of claim 13,
wherein the digital signal processor records a time series of a plurality of transmission power data messages for a predetermined duration.

18. The system for validating a new add channel wavelength in colorless multiplexing of claim 13,
wherein a one or more modulation frequency component that corresponds to predetermined detection criteria is identified by a peak-find algorithm.

* * * * *